J. W. CRUIKSHANK.
APPARATUS FOR MANIPULATING PLATE GLASS.
APPLICATION FILED JUNE 20, 1912.
1,248,819.
Patented Dec. 4, 1917.
3 SHEETS—SHEET 1.
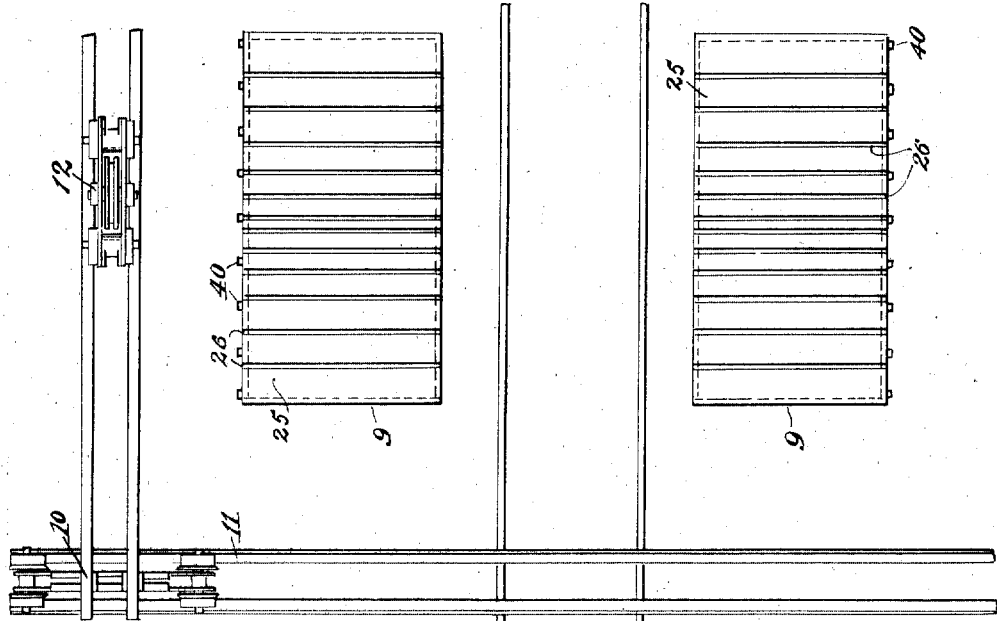
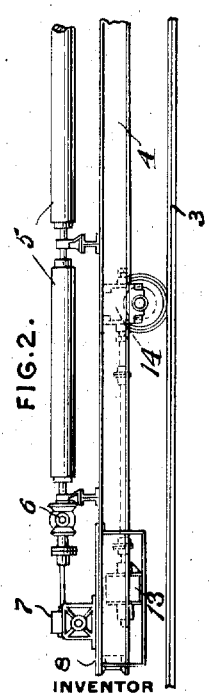
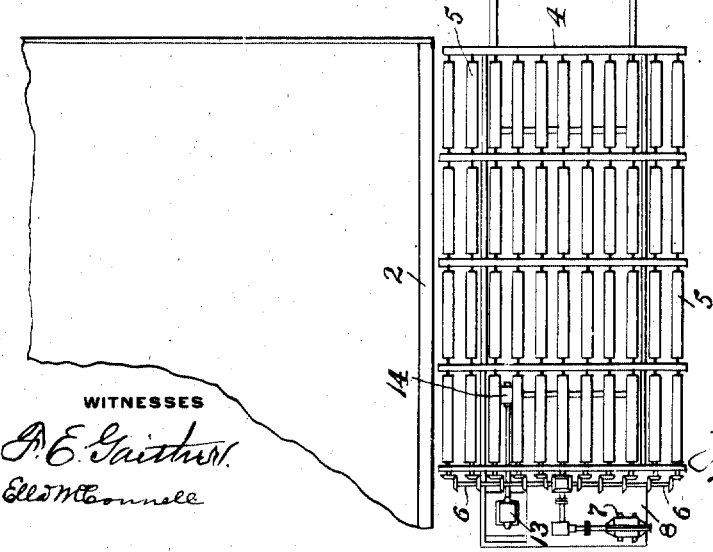

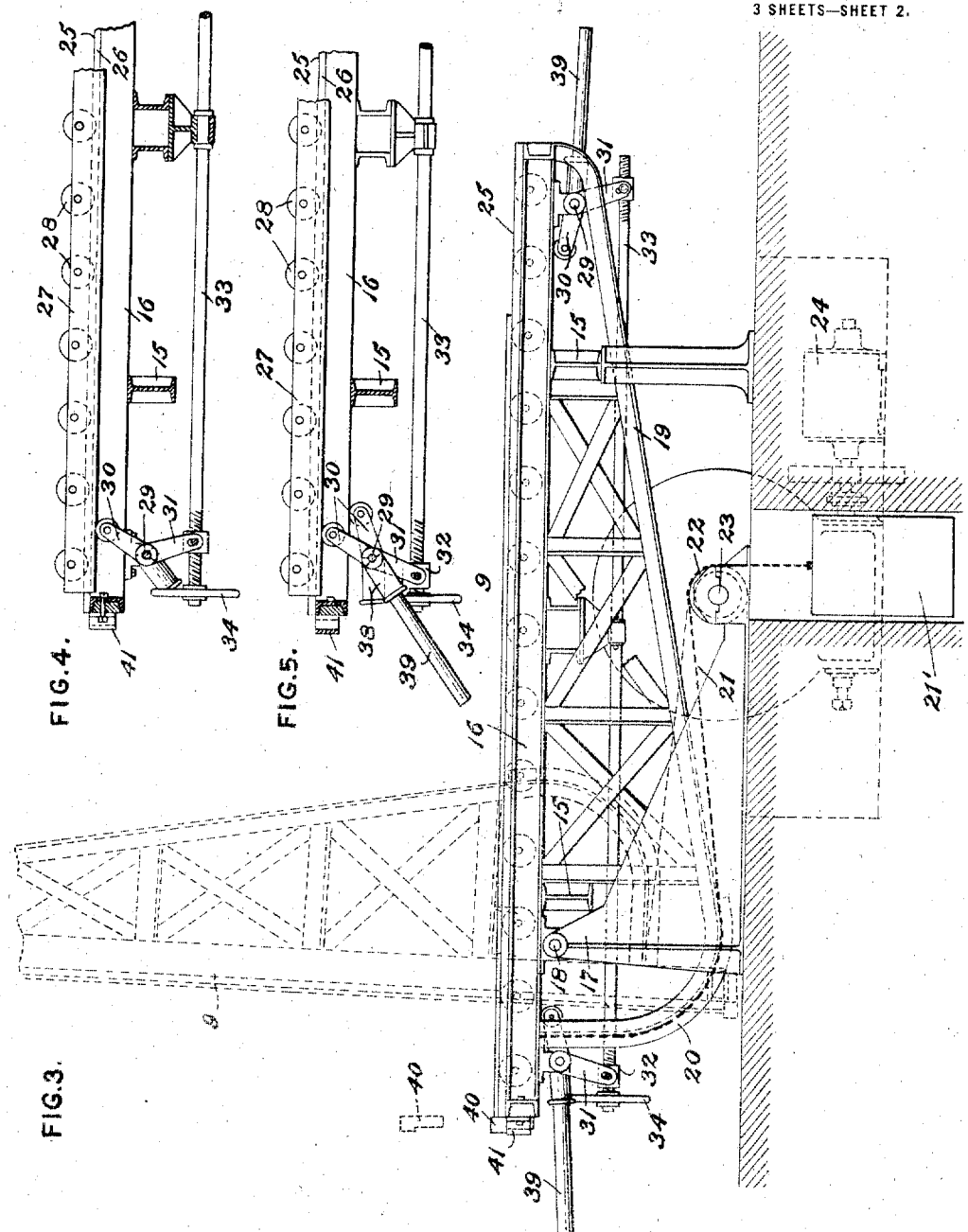

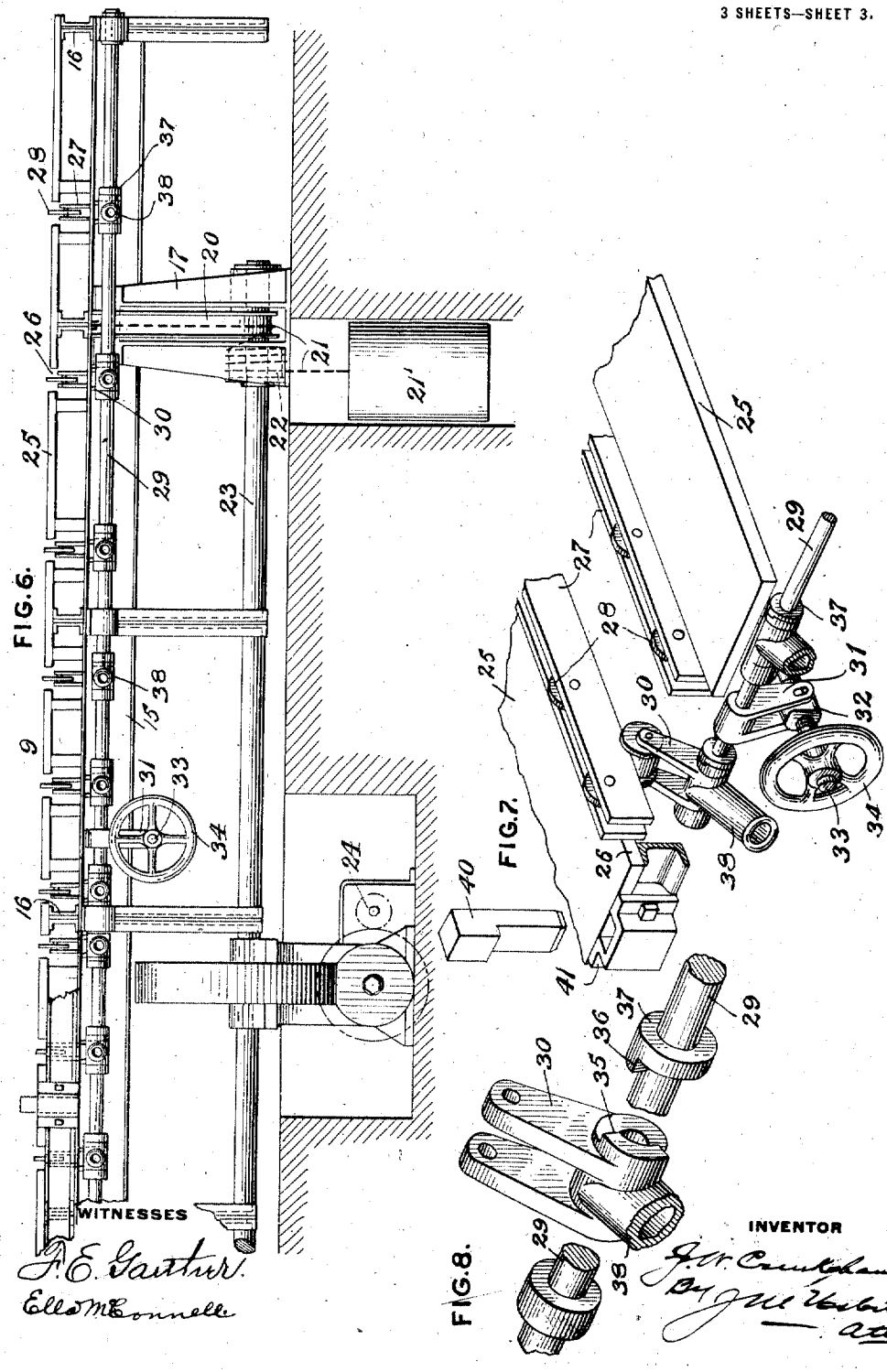

UNITED STATES PATENT OFFICE.

JAMES W. CRUIKSHANK, OF PITTSBURGH, PENNSYLVANIA, ASSIGNOR TO J. W. CRUIK-SHANK ENGINEERING COMPANY, OF PITTSBURGH, PENNSYLVANIA.

APPARATUS FOR MANIPULATING PLATE-GLASS.

1,248,819.  Specification of Letters Patent.  Patented Dec. 4, 1917.

Application filed June 20, 1912. Serial No. 704,846.

*To all whom it may concern:*

Be it known that I, JAMES W. CRUIK-SHANK, a resident of Pittsburgh, in the county of Allegheny and State of Pennsylvania, have invented certain new and useful Improvements in Apparatus for Manipulating Plate-Glass, of which the following is a specification.

One object of the invention is to facilitate the transfer of plate glass from the leer to the cutting table as well as the manipulation thereof on the table, provision being had for moving the plates to place them in the most advantageous position for squaring and cutting to size. A further object is to provide mechanical means for withdrawing the plates from the leer, also for placing them on the cutting table. The transfer mechanism is adapted to coöperate with two tables interchangeably, avoiding delays that often occur when only one table is available.

Still a further object is to provide a tilting cutting table of improved construction, the table being equipped with means for lifting all or only a portion of the plates resting thereon, as may be desired.

In the accompanying drawings, Figure 1 is a diagrammatic plan view of apparatus embodying the invention. Fig. 2 is a side view of a portion of the transfer car. Fig. 3 is an end elevation of one of the cutting tables, the same being shown raised or tilted in dotted lines. Fig. 4 is a section of a portion of the table illustrating the mechanism which operates all of the plate roller supports simultaneously, and Fig. 5 illustrates the mechanism whereby any one of the roller supports may be moved independently of the others. Fig. 6 is a side elevation of a portion of one of the cutting tables. Figs. 7 and 8 are views in detail of the mechanism for operating the plate supports.

Referring to the drawings, 2 designates the discharge end of a plate glass annealing leer which may be of any desired construction, and 3 are tracks extending past the leer discharge on which moves the transfer car or truck 4. The plate supporting surface of the truck consists of a series of roller shafts 5 whose axes are parallel with tracks 3 and at right angles to the direction of movement of the plates as they discharge from leer 2. At one end of the car shafts 5 are geared to transverse shafts 6 and these shafts are geared to and driven by an electric motor 7, mounted on an end extension or shelf 8 of the car, the gearing being so arranged that all of shafts 5 may be rotated simultaneously in the same direction. For withdrawing plates from the leer it is only necessary to project them onto the edge of the car when the motor-driven rollers will take hold and fully withdraw them. A motor 13 on shelf 8 may be geared at 14, Figs. 1 and 2, to an axle of the car for propelling the same.

The plate laden car is moved along tracks 3 into position to discharge the plates for cutting, and in the preferred adaptation of the invention two cutting tables 9 are provided, one arranged at either side of the tracks, so that the plates may be transferred to either table and the removal of plates from the leer need not be interrupted by congestion of work on one table as is now frequently the case. The cutting tables may be located in close proximity to the leer or at a distance therefrom as desired, and may be inclosed or housed in a building quite separate from the leer. Each of the tables is adapted to tilt vertically for placing the plates on edge as is necessary for removing them, and when two tables are employed I prefer to so arrange them that the sides or edges thereof adjacent tracks 3 are the portions that rise when the tables are tilted. An overhead crane 10 is provided for removing the plates from the tilting tables and for carrying them to the stock racks or other places within the plant, the ends of the crane moving on tracks of usual construction, one of which is indicated at 11, Fig. 1, the crane being provided with the usual hoisting buggy 12. No novelty is claimed for the overhead crane, nor broadly for a vertically tilting table, these features being old in the art.

Each of tables 9 consists of a frame work composed of longitudinal beams 15 and transverse beams 16. The table is mounted on its under side and inwardly from a longitudinal edge thereof to oscillate vertically on supports 17, 18 indicating the center about which the table moves. Included in the table underframe are beams or girders 19, each of which is formed with a curved or rounded end portion 20 which is channeled as shown to provide guides for chains 21 which are secured to the table. The chains are adapted to wind on drums 22 secured to shaft 23 suitably mounted beneath the table and adapted to be actuated by motor 24. Weights 21' are secured to the ends of chains 21 and serve as counterweights in elevating the table.

The top surface 25 of the table is preferably of wood and is slotted transversely at 26. Movable vertically through each of these slots is a bar 27 to which is journaled a series of plate supporting rollers 28. Journaled to the under side of the table adjacent its longitudinal edges are shafts 29, and crank arms 30 are mounted on these shafts and adapted to oscillate vertically either therewith or thereon for raising and lowering bars 27. Depending from shafts 29 are arms 31 which carry threaded sleeves 32 in which operate shaft 33 provided with hand-wheel 34, shaft 33 being so threaded that rotation thereof in one direction moves arms 31 inward or toward each other for raising crank arms 30 and bars 27, while rotation in a reverse direction imparts a reverse movement to the crank arms.

Connection between shafts 29 and crank arms 30 is shown in detail in Figs. 7 and 8. Each of arms 30, which are loose on shafts 29, is formed with clutch face 35 which is engaged by a similar face 36 of collar 37 fast on the shaft, so that when the shaft is turned in direction to raise arms 30 each of the latter are raised. Each of arms 30 is provided with a socket 38 which is adapted to receive a removable handle 39, and by this means any of the arms 30 and the roller bars supported thereby may be raised independently of the other bars, the arms simply turning on the shafts and out of engagement with the shouldered collars 37, as will be understood.

It will be noted that the axes of all of rollers 28 are parallel with the axes of the rollers on the transfer car, so that the car rollers may be motor-driven for moving the plate or plates therefrom to the table and at which time the bars 27 are raised above surface 25 sufficiently to receive the plates and facilitate their movement. The bars may then be lowered, permitting the plates to rest on top surface 25, or they may be so adjusted as to support the plate just above said surface so that the plate may be conveniently moved toward either edge of the table for facilitating the cutting operation. If the line of cut is longitudinally of the table, the plate may be rolled toward one longitudinal edge or the other of the table so that the part to be severed may be projected from the table and snapped. If the line of the cut is transversely of the table, one or another of the individually movable bars 27 which is adjacent to and parallel with the diamond score may be raised, thus snapping the plate on any line across the table that may be desired.

After the plate has been cut, removable pins 40 may be placed in holes or sockets 41 in top surface 25 to provide rests for the lower edges of the cut plates when the table is turned upward, as in dotted lines in Fig. 3, thereby supporting the plates on edge and in position to be removed by the traveling crane 10. The plate-engaging hooks or other means for removing the plates from the table are not shown, being old and well known in the art.

Heretofore, it has been usual to employ only a single cutting table which frequently becomes congested with broken glass, etc., and seriously delays the removal of plates from the leer. By employing two tables capable of interchangeable use and with mechanical means for facilitating movement of the plates to and from the transfer car, the work may proceed expeditiously and with a comparatively small amount of hand labor. In fact, the elimination of a very considerable part of hand work commonly required for transferring and cutting glass plates is characteristic of the improved apparatus. The handling of heavy plate glass is a delicate and dangerous operation, and the elimination of much of this hand work by the substitution of accurately operating mechanical means greatly reduces the danger of accidents, avoids breakage, and renders it possible to conduct the work more expeditiously and with greater accuracy.

Prior to the present invention it has been customary to arrange a single cutting table in fixed or unshifting position at the discharge end of the leer, in which position the cutters are exposed to the heat and gases discharging from the leer. Such arrangement is open to the further objection that such single cutting table frequently becomes conjested, seriously retarding the work. Successful practice necessitates locating the leer, including its discharge end, in a closed building to exclude drafts and sudden changes in temperature that may injuriously affect the glass within the leer and the glass as it emerges therefrom. These requirements hamper manipulating the delivered glass and add to the inconvenience and discomfort of the workman at the cutting table. With the present invention these difficulties are overcome as the leer and cutting table or tables may be arranged in separate buildings which are connected by the tracks over which the transfer car travels, thereby making it possible to arrange the table or tables in a separate roomy building in which the work may proceed without hindrance and in which the plate removing crane may be conveniently arranged and operated.

I claim:—

1. In plate glass apparatus, the combination with the discharge end of a leer, of a plurality of cutting tables arranged at a distance from the leer, tracks extending from the leer end to said tables, a transfer car movable on the tracks and adapted to receive plates from the leer and discharge them on one or another of the tables interchangeably, plate moving means on the transfer car, and means on the cutting tables for raising said plates relatively to the surface of the tables.

2. In plate glass apparatus, the combination with the discharge end of a leer, of tracks extending from said leer end at right angles to the direction of movement of the plates when discharging from the leer, cutting tables arranged at opposite sides of the tracks at a distance from the leer, a transfer car movable on the tracks for delivering plates to one or another of the cutting tables, plate moving means on the transfer car, and means on the cutting tables for raising said plates relatively to the surface of the tables.

3. In plate glass apparatus, the combination with the discharge end of a leer, of a cutting table located at a distance from the leer, means for moving the table from horizontal plate-receiving position to upright plate-delivering position, tracks extending from the leer end to the table, and a transfer car movable on the tracks and adapted to receive plates from the leer and deliver them to the table when the latter is in plate-receiving position.

In testimony whereof I affix my signature in presence of two witnesses.

JAMES W. CRUIKSHANK.

Witnesses:
J. M. NESBIT,
F. E. GAITHER.